United States Patent [19]

McCoy

[11] 3,760,029
[45] Sept. 18, 1973

[54] DIMETHYLSULFIDE REMOVAL IN THE ISOMERIZATION OF NORMAL PARAFFINS

[75] Inventor: Charles S. McCoy, Orinda, Calif.

[73] Assignee: Chevron Research Company, San Francisco, Calif.

[22] Filed: May 6, 1971

[21] Appl. No.: 142,839

Related U.S. Application Data

[63] Continuation of Ser. No. 803,123, Feb. 27, 1969, abandoned.

[52] U.S. Cl......... 260/683.68, 208/250, 260/683.65
[51] Int. Cl............................................... C07c 5/30
[58] Field of Search................. 260/683.68, 683.65, 260/683.73; 208/208 R, 250

[56] References Cited
UNITED STATES PATENTS

| 3,051,646 | 8/1962 | Brooke | 208/250 |
| 3,047,646 | 7/1962 | Carr | 260/683.68 |
| 3,445,542 | 5/1969 | Bunn, Jr. et al. | 260/683.65 |
| 3,540,998 | 11/1970 | Bercik et al. | 260/683.65 |
| 2,924,629 | 2/1960 | Donaldson | 260/683.73 |
| 3,472,912 | 10/1969 | Quisenberry | 260/683.65 |

Primary Examiner—Delbert E. Gantz
Assistant Examiner—G. J. Crasanakis
Attorney—A. L. Snow, F. E. Johnston, C. J. Tonkin and Dix A Newell

[57] ABSTRACT

Dimethylsulfide, which is found to be especially harmful in the isomerization of normal butane and/or normal pentane in the presence of hydrogen and with a platinum-alumina catalyst, is removed by contacting the hydrocarbon or hydrogen feed with molecular sieve particles. The molecular sieves are regenerated at least every 24 hours in order to maintain less than 1 ppm dimethylsulfide in the reactor feed.

8 Claims, No Drawings

DIMETHYLSULFIDE REMOVAL IN THE ISOMERIZATION OF NORMAL PARAFFINS

This application is a continuation of Ser. No. 803,123 filed Feb. 27, 1969, now abandoned.

PRIOR ART

Normal butane and normal pentane find limited utility for use in motor fuels. Generally, the n-butane and n-pentane are low octane components and are considered undesirable in high octane blending stocks. However, isobutane and isopentane are particularly valuable for use in upgrading gasolines to increase their octane numbers. Furthermore, isobutane is of special importance in the alkylation of unsaturated hydrocarbons. It is, therefore, highly desirable to have a convenient and relatively inexpensive process for the isomerization of normal $C_4$ and $C_5$ hydrocarbons.

Generally, isomerization of n-butanes and/or n-pentanes is conducted in the vapor phase over a catalyst comprising a platinum group component in association with a porous solid carrier. Preferably the platinum group component is platinum and the porous solid carrier is alumina. In the isomerization process with a platinum group component catalyst, some degree of care is exercised to maintain the concentration of $H_2S$ in the reaction zone at a low level. However, $H_2S$ is not a particularly troublesome compound in the isomerization process since it is relatively easy to restore the catalyst to its initial activity and stability after having been in contact with $H_2S$. Furthermore, it is easy to maintain $H_2S$ at a low concentration in the isomerization process by the use of $H_2S$ scrubbers or adsorbers, for example, molecular sieves, in the feed stream as well as the recycle hydrogen stream. Molecular sieves, in general, are very effective for removing $H_2S$. Most other common sulfur compounds encountered in the refinery, in addition to $H_2S$, for example, mercaptans and alkyldisulfides, are also considered as not particularly troublesome in the isomerization process since such sulfur compounds readily convert to $H_2S$ at the conditions of the isomerization process.

It has now been found that dialkylsulfides, particularly dimethylsulfide (DMS) severely poisons a platinum group component catalyst when operating at normal butane or normal pentane isomerization conditions. Dialkylsulfides are not easily converted to $H_2S$ at the reaction conditions found in a n-butane or n-pentane isomerization process. Furthermore, it is difficult to remove dialkylsulfides from the feed stream and/or the recycle stream inasmuch as the adsorption capacity of common adsorbents, for example, molecular sieves, is low for such compounds.

SUMMARY OF THE INVENTION

Thus, the process of the present invention relates to a process wherein a feed selected from the group consisting of n-butane and n-pentane and mixtures thereof is isomerized in the presence of hydrogen at isomerization conditions with a catalyst comprising a platinum group component in association with a porous solid carrier to produce isobutane and/or isopentane. The improvement in the isomerization process comprising controlling the dialkylsulfide concentration in a process wherein substantial amounts of dialkysulfides are present, e.g., greater than 1 ppm, so that less than one part of dialkylsulfide to 1,000,000 parts of feed is present in the reaction zone. Preferably the dialkylsulfide concentration is controlled at the low limits by the use of molecular sieves of about 4–15 Angstroms diameter in the feed stream and recycle stream, which molecular sieves are frequently regenerated to maintain their adsorption capacity for dialkylsulfides at a maximum.

DESCRIPTION OF THE INVENTION

The isomerization of n-butane and/or isobutane is generally accomplished in the vapor phase at reaction conditions including a temperature in the range of from 300° to 450° F and preferably in the range of from 300° to 400° F. The pressure in the reaction zone is generally in the range of from 300 to 900 psig and preferably in the range of from 400 to 700 psig. The liquid hourly space velocity will fairly depend upon the temperature and pressure and preferably will be in the range of from 0.1 to 10, and more preferably, from 0.5 to 5.

The isomerization of n-butane and/or n-pentane is performed in the presence of hydrogen. Hydrogen is generally present in an amount of from 0.1 to 10 moles of hydrogen per mole of feed, and preferably from 0.5 to 2 moles of hydrogen per mole of feed. The presence of hydrogen favorably improves the conversion of n-butane and n-pentane to isobutane and isopentane, respectively. Furthermore, the presence of hydrogen in the reaction zone helps reduce the formation of coke which tends to poison the catalyst. The hydrogen is recovered from the effluent from the isomerization reactor and preferably purified and recycled to the reaction zone. The hydrogen to the reaction zone may thus consist solely of recycle hydrogen or a mixture of recycle hydrogen and make-up hydrogen or, simply, make-up hydrogen. Generally, however, a recycle stream is used in the isomerization process.

Best isomerization results are obtained with the use of substantially pure n-butane or n-pentane or mixtures thereof. Thus, preferably the feeds will be at least 90 percent n-butane or n-pentane or mixtures thereof. However, the isomerization process can also be conducted with feeds, which, besides the n-butane or n-pentane hydrocarbons, or mixtures thereof, contain certain amounts of other hydrocarbons. While the admixture of large percentages of higher hydrocarbons, such as naphtha, has a damaging effect on the process or cause reactions which inhibit or suppress the isomerization of the n-butane or n-pentane, or mixtures thereof, it is possible to have small percentages of such higher hydrocarbons with n-butane or n-pentane, or mixtures thereof, and may even be of some advantage in that part of the hydrogen required in the process may be furnished thereby. Naphthas rich in naphthenes are particularly well-suited for the purpose. The naphthas can be useful for furnishing, by dehydrogenation, at least part of the hydrogen requirements of the process. Thus, it is preferred that when other hydrocarbons are present besides n-butane and/or n-pentane that these other hydrocarbons be naphthenes.

The presence in the charge stock of n-pentenes and/or n-butenes will not be damaging although isomerization of these unsaturated hydrocarbons can easily be carried out without the use of a platinum group component catalyst. In the presence of a sufficient amount of free hydrogen in the reaction mixture, such unsaturated hydrocarbon mixtures will be converted to saturated hydrocarbons during the process.

The platinum group component catalyst which finds use in n-butane and/or n-pentane isomerization comprises a platinum group component in association with a porous solid carrier. Preferably the porous solid carrier is a porous inorganic oxide and preferably a high surface area inorganic oxide, for example, an inorganic oxide having a surface area of from 50 to 700 m$^2$/gm and preferably from 100 to 700 m$^2$/gm. Satisfactory porous solid carriers for the preparation of the catalyst for use in the process of the invention include silica, zirconia, magnesia, thoria, alumina, etc. and combinations of these, for example, silica-alumina, silica-zirconia, alumina-silica-magnesia, alumina-thoria, alumina-thoria-zirconia, etc.

Alumina is a particularly suitable carrier or support for the catalyst used in the present invention. Furthermore, alumina can be prepared by a variety of methods for purposes of this invention. Thus, the alumina can be prepared by adding a suitable alkaline agent such as ammonium hydroxide to a salt of aluminum, such as, aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as, ammonium hydroxide, followed by drying and calcination.

The platinum group component catalyst should contain a platinum group component in an amount of from 0.01 to 3 weight percent and preferably 0.1 to 1 weight percent based on the finished catalyst. The platinum group component embraces all the members of Group VIII of the Periodic Table having an atomic weight greater than 100 as well as compounds and mixtures of any of these. Thus, the platinum group components are the Group VIII noble metals or compounds thereof. Platinum is preferred because of its better perforannce in isomerization reactions. Regardless of the form in which the platinum group component exists on the catalyst, whether as metal or compound, the weight percent is calculated as the metal.

The platinum group component is associated with the porous solid carrier by various methods. The platinum group component can be disposed on the carrier by a suitable technique such as ion-exchange, impregnation, coprecipitation, etc. Generally, it is preferred that the platinum group component be associated with the porous solid carrier by impregnation. The impregnation is generally accomplished with an aqueous solution of a decomposable compound of a platinum group metal in sufficient concentration to provide the desired quantity of the platinum group component on the finished catalyst. Preferred platinum group compounds include chloroplatinic acid, ammonium chloroplatinates, polyammineplatinum salts, palladium chloride, iridium chloride, chloroiridic acid, etc.

The catalyst comprising the platinum group component in association with the porous solid carrier is usually dried by heating at a temperature of, for example, no greater than 500° F and preferably at about 200° to 400° F. Thereafter the composite can be calcined at an elevated temperature, for example, up to 1,200° F if desired.

The catalyst is preferably heated at an elevated temperature in the presence of hydrogen prior to contact with the n-butane and/or n-pentane feed in the isomerization process. Preferably the heating is performed in the presence of hydrogen and more preferably dry hydrogen. It is particularly preferred that the heating be accomplished at a temperature in the range of 600° to 1,300° F and more preferably 600° to 1,000° F.

Various promoters may be incorporated with the platinum group component to increase the activity, stability, and other characteristics of the catalyst. Metal promoters as, for example, rhenium, may be added. Also, combinations of one platinum group component with another platinum group component, such as, e.g., platinum and iridium, may be used.

Halides, particularly fluoride or chloride can be used to promote the catalyst for isomerization on n-butane and/or n-pentane. Chloride is the preferred halide. The halides apparently provide a limited amount of acidity to the catalyst which is beneficial to most isomerization reactions. A catalyst promoted with halide preferably contains from 0.1 to 10 weight percent total halide content, more preferably 3 to 6 weight percent. The halide can be incorporated onto the catalyst at any suitable stage of catalyst manufacture, e.g., prior to or following incorporation of the platinum group component. Some halide is often incorporated with the catalyst by impregnation with the platinum group component; that is, for example, impregnation with chloroplatinic acid normally results in chloride addition to the catalyst. Additional halide may also be incorporated with the catalyst, if desired. In general, the halides are combined with the catalyst by contacting a suitable compound, such as, hydrogen fluoride, ammonium fluoride, hydrogen chloride, ammonium chloride, either in the gaseous form or in a water soluble form with the catalyst. Preferably, the fluoride or chloride is incorporated with the catalyst from an aqueous solution containing the halide.

Dialkylsulfides, particularly dimethylsulfide (DMS), are very deleterious to the isomerization process using the platinum group component catalyst. As indicated previously, dialkylsulfides severely deactivate the platinum group component catalyst. Once deactivated with dialkylsulfides the catalyst cannot easily be reactivated or restored to its initial activity. Furthermore dialkylsulfides do not convert to H$_2$S at the low temperatures and pressures used in the n-butane and/or n-pentane isomerization process. Thus, dialkylsulfides are unlike other sulfur compounds which do convert to H$_2$S at low temperatures and pressures. Mercaptans, carbonylsulfide and dimethyldisulfide are examples of sulfur compounds which are readily converted to H$_2$S at n-butane and/or n-pentane isomerization conditions.

Dialkylsulfides are not normal constituents of petroleum. However, dialkylsulfides can occur in the isomerization process by several means. Thus, dialkylsulfides are often introduced into the isomerization zone as a constituent of a natrual gas stream which is used to purge molecular sieve adsorbents, the molecular sieve adsorbents being used for purifying the recycle hydrogen stream or feed stream, etc. Also, dialkylsulfides may be introduced into the isomerization process from the butane or pentane feeds, particularly butane or pentane feeds which are spiked with crude petroleum constituents. Regardless of the source of dialkylsulfides, it is necessary that the dialkylsulfides do not exceed about 1 ppm based on the feed in the reaction zone; otherwise, severe poisoning of the catalyst can occur. Generally, anywhere from 0.001 to 1 ppm or less DMS can be tolerated.

In a typical isomerization process a feed comprising n-butane, n-pentane, or mixtures thereof, is passed to a deisobutanizer to remove any isobutane and/or isopentane present therein. The deisobutanizer is in principle a fractionating column. The concentrated n-butane and/or n-pentane is removed from the bottom of the deisobutanizer, mixed with hydrogen which has been conveniently obtained, for example, from a reforming unit, heated, and passed at a moderate pressure and temperature to the isomerization reactor containing the platinum group component catalyst. The n-butane and/or n-pentane is converted in the isomerization zone in high yields to isobutane and/or isopentane. The effluent removed from the isomerization reactor is cooled and passed to a separator from which hydrogen and light gases are separated from the liquid butane or pentane products. The recovered hydrogen and light gases are then recycled to the isomerization reaction zone.

As a preferred embodiment of the present invention the hydrogen and any makeup hydrogen are passed in contact with an adsorbent for removing dialkylsulfide before being passed to the isomerization zone. The preferred adsorbent is a molecular sieve of the crystalline form having uniform pore diameters of less than about 10A. Suitable molecular sieves are described in the prior art and include commercially available sieves such as zeolite A, X, L, Y, mordenite, montmorillonite, baroid clays, etc. Other suitable dialkylsulfide adsorbents include supported nickel and molybdenum oxides and zinc oxides.

The liquid comprising isobutane and/or isopentane as well as unconverted n-butane and/or n-pentane is generally passed from the separator to a stabilizer wherein the remaining light gases and hydrogen are removed. The stabilized bottoms product is then deisobutanized generally in the same column as used to deisobutanize the fresh feed. The high purity isobutane and/or isopentane is taken overhead as product from the deisobutanizer together with any isobutane and/or isopentane introduced in the fresh feed. N-butane and/or n-pentane removed from the deisobutanizer is then passed in admixture with hydrogen to the isomerization zone.

As a particular embodiment of the present invention it is preferred that the feed passed to the isomerization zone be purified of dialkylsulfides, particularly dimethylsulfide, by contact with an adsorbent such as, for example, a molecular sieve. The same type adsorbent used to purify the hydrogen stream may suitably be used to purify the feed to the isomerization zone.

It is necessary to frequently regenerate the adsorbent used to remove dialkylsulfides from the feed and/or hydrogen streams. Thus in the case of a molecular sieve, which is the preferred adsorbent for dialkylsulfides, it may be necessary to regenerate the molecular sieve as often as every 24 hours. Most adsorbents, such as molecular sieves, have a limited adsorption capacity for dialkylsulfides. Thus, dialkylsulfides apparently break through the sieve very rapidly unless the molecular sieve is frequently regenerated. The regeneration of the molecular sieve is accomplished by purging at an elevated temperature with a gas such as nitrogen, natural gas, butane mixtures of nitrogen and natural gas, flue gas, etc. Generally regeneration is accomplished by passing the purge gas through the molecular sieve in a direction opposite to that used for the feed stream or recycle hydrogen stream. The purging is generally performed until very limited sulfur or water and no dialkylsulfides are evident in the exiting purge stream. Suitably, regeneration is conducted at temperature of from about 450° to 600° F. In order to maintain frequent regeneration of the adsorbent, for example, the molecular sieve, it may be desirable to have several adsorbents in parallel so that as one is removed for regeneration, others may be used for adsorption; thus, a continuous process can be maintained.

The effect of dimethylsulfide (DMS) upon a butane isomerization process is evident from the following example using a butane isomerization plant conducted at a temperature of about 350° F, a pressure of about 450 psig, a liquid hourly space velocity of about 0.7 and a hydrogen to hydrocarbon mole ratio of about 0.5. The isomerization process was similar to that previously described. That is, butane feed was passed to a deisobutanizer to remove isobutane. The butane feed was then mixed with hydrogen, heated, passed to an isomerization reactor, and contacted therein with a catalyst comprising about 0.5 weight percent platinum in association with alumina. The effluent from the isomerization zone was then passed to a separator to remove hydrogen and light gases from the effluent. Hydrogen was recycled to the isomerization zone. The isomerized product was stabilized, then passed to the deisobutanizer to remove isobutane. Molecular sieves having pore diameters of about 10A were used to purify the butane feed and make-up hydrogen stream to the reaction zone.

The first catalyst charge in the isomerization zone lasted for a life of about 99 barrels of isobutane produced per pound of catalyst. The normal butane feed was treated with 10A sieves at a space velocity of about 1.0; the sieves were regenerated daily. Less than about 1 ppm DMS was permitted in contact with the catalyst during the isomerization process.

A second catalyst charge in the isomerization zone performed poorly from the outset. The top half of the catalyst bed was totally deactivated, as evidenced by lack of temperature rise, after about 15 barrels isobutane produced per pound of catalyst. During this run, regeneration of the sieves had been extended to once every 4 days; however, no water nor $H_2S$ in the reactor feed was detected. Analysis of the raw feed, recycle gas, and other samples by mass spectrometry, chromatography and other techniques clearly showed the presence of dimethylsulfide.

When the sieve regeneration cycle was restored to once a day, DMS disappeared and deactivation stopped. Nevertheless, the top half of the catalyst did not recover appreciable activity. This permanent loss of activity is a unique characteristic of DMS poisoning: $H_2S$ (and other sulfur compounds which convert to $H_2S$) cause a general loss of activity throughout the bed which is reversible when $H_2S$ is removed from the system.

The foregoing disclosure of this invention is not to be considered as limiting since many variations can be made by those skilled in the art without departing from the scope or spirit of the appended claims.

What is claimed is:

1. In a process wherein a hydrocarbon feed selected from the group consisting of a normal butane and normal pentane and mixtures thereof is isomerized, in a reactor in the presence of hydrogen fed to the reactor, at isomerization conditions with a catalyst comprising alumina in association with a platinum group component and wherein substantial amounts of dimethylsulfides are present, the improvement which comprises controlling the dimethylsulfide concentration in the feed to the reactor, by removing dimethylsulfides from the isomerization hydrocarbon feed or hydrogen feed by contacting the hydrocarbon or hydrogen feed with molecular sieve particles having sieve openings of about four to 15 Angstroms in diameter and regenerating the molecular sieves at least about every 24 hours, so that less than than one part dimethylsulfide per million parts of feed is present in the reactor feed.

2. The process of claim 1 wherein said feed is normal butane.

3. The process of claim 1 wherein said feed is normal pentane.

4. The process of claim 1 wherein said porous solid carrier is alumina.

5. The process of claim 1 wherein said catalyst comprises alumina in association with from 0.01 to 3 weight percent platinum.

6. The process of claim 1 wherein said catalyst contains from 3 to 6 weight percent halide.

7. The process of claim 6 wherein said halide is chloride.

8. The process of claim 1 wherein said isomerization conditions include a temperature of from 300° to 450° F. and a pressure from 300 to 900 psig.

* * * * *